US011740466B1

(12) United States Patent
Bhakta et al.

(10) Patent No.: US 11,740,466 B1
(45) Date of Patent: Aug. 29, 2023

(54) OPTICAL SYSTEMS WITH SCANNING MIRROR INPUT COUPLERS

(71) Applicant: Apple Inc., Cupertino, CA (US)

(72) Inventors: Vikrant Bhakta, Santa Clara, CA (US); Guolin Peng, Sunnyvale, CA (US); Hyungryul Choi, San Jose, CA (US); Scott M. DeLapp, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/203,368

(22) Filed: Mar. 16, 2021

Related U.S. Application Data

(60) Provisional application No. 62/992,665, filed on Mar. 20, 2020.

(51) Int. Cl.
*G02B 27/01* (2006.01)
*G06F 3/01* (2006.01)

(52) U.S. Cl.
CPC ......... *G02B 27/0172* (2013.01); *G06F 3/013* (2013.01); *G02B 2027/0187* (2013.01)

(58) Field of Classification Search
CPC ........ G02B 27/0172; G02B 2027/0187; G06F 3/013
See application file for complete search history.

(56) References Cited

U.S. PATENT DOCUMENTS

| 7,589,901 | B2 | 9/2009 | DeJong et al. |
| 7,613,373 | B1 | 11/2009 | DeJong |
| 8,649,099 | B2 * | 2/2014 | Schultz .............. G02B 27/0101 359/630 |
| 9,885,877 | B2 | 2/2018 | Yonekubo et al. |
| 9,959,818 | B2 | 5/2018 | Bohn |
| 10,025,093 | B2 | 7/2018 | Wall et al. |
| 10,578,870 | B2 | 3/2020 | Kimmel |
| 10,908,426 | B2 | 2/2021 | Amitai |
| 11,067,797 | B2 * | 7/2021 | Schowengerdt ....... G02B 30/52 |
| 11,169,379 | B2 * | 11/2021 | Chi ..................... G02B 27/4272 |
| 2009/0015929 | A1 * | 1/2009 | DeJong .............. G02B 27/0081 359/636 |
| 2013/0051730 | A1 * | 2/2013 | Travers .............. G02B 27/4272 385/37 |
| 2016/0077338 | A1 * | 3/2016 | Robbins ................... G02B 6/34 359/489.08 |
| 2017/0160548 | A1 * | 6/2017 | Woltman ........... G02B 27/4205 |
| 2017/0235142 | A1 * | 8/2017 | Wall ........................ G02B 5/26 359/633 |
| 2017/0299860 | A1 * | 10/2017 | Wall ......................... G02B 3/04 |

(Continued)

*Primary Examiner* — Ricardo Osorio

(74) *Attorney, Agent, or Firm* — Treyz Law Group, P.C.; Michael H. Lyons

(57) ABSTRACT

An electronic device may include a display module that generates light and an optical system that redirects the light towards an eye box. The system may include an input coupler that couples the light into the waveguide. The input coupler may include a prism on the waveguide and a scanning mirror. The scanning mirror may receive the light through the waveguide and the prism and may reflect the light into the waveguide through the prism while being rotated over a set of orientations. The scanning mirror may fill a relatively large field of view eye box with a corresponding image frame despite the limited field of view of the image light produced by the display module. The orientation of the scanning mirror may be adjusted based on gaze tracking data.

20 Claims, 8 Drawing Sheets

(56) References Cited

U.S. PATENT DOCUMENTS

| | | | |
|---|---|---|---|
| 2018/0255278 A1* | 9/2018 | Tardif | G02B 27/0172 |
| 2019/0101866 A1* | 4/2019 | Georgiou | G02B 27/0172 |
| 2019/0155021 A1* | 5/2019 | Wall | G02B 26/121 |
| 2019/0235252 A1* | 8/2019 | Freedman | G06F 1/163 |
| 2020/0159020 A1 | 5/2020 | Peng et al. | |
| 2021/0157142 A1* | 5/2021 | Scheller | H01L 33/24 |

\* cited by examiner

OPTICAL SYSTEMS WITH SCANNING MIRROR INPUT COUPLERS

This application claims the benefit of U.S. Provisional Patent Application No. 62/992,665, filed Mar. 20, 2020, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display module that generates image light and an optical system that redirects the light from the display module towards an eye box. The optical system may include an input coupler and an output coupler formed on a waveguide. The input coupler may redirect light from the display module so that the light propagates in the waveguide towards the output coupler. The output coupler may couple the light out of the waveguide and towards the eye box. The output coupler may include diffractive grating structures such as volume holograms in the waveguide.

The input coupler may be a prism mounted to the waveguide. The prism may have a tilted surface oriented at a non-parallel angle with respect to a lateral surface of the waveguide. The input coupler may include a scanning mirror that overlaps the tilted surface of the prism and that is separated from the tilted surface of the prism by a non-zero distance. The scanning mirror may receive the image light through the waveguide and the prism. The scanning mirror may reflect the image light into the waveguide through the prism while being rotated over a set of orientations. The scanning mirror may be used to fill a relatively large field of view at the eye box with different portions of a corresponding image frame. In another suitable arrangement, the scanning mirror may fill different portions of the large field of view at the eye box at different times based on gaze tracking data (e.g., different portions of the field of view that follow a direction of a user's gaze). If desired, the scanning mirror may be replaced by a liquid crystal steering element that transmits the image light into the waveguide through a transmissive input coupling prism. This may allow the eye box to exhibit a relatively large field of view without the need to increase the size or power consumption of the display module.

DETAILED DESCRIPTION

Figure 1:
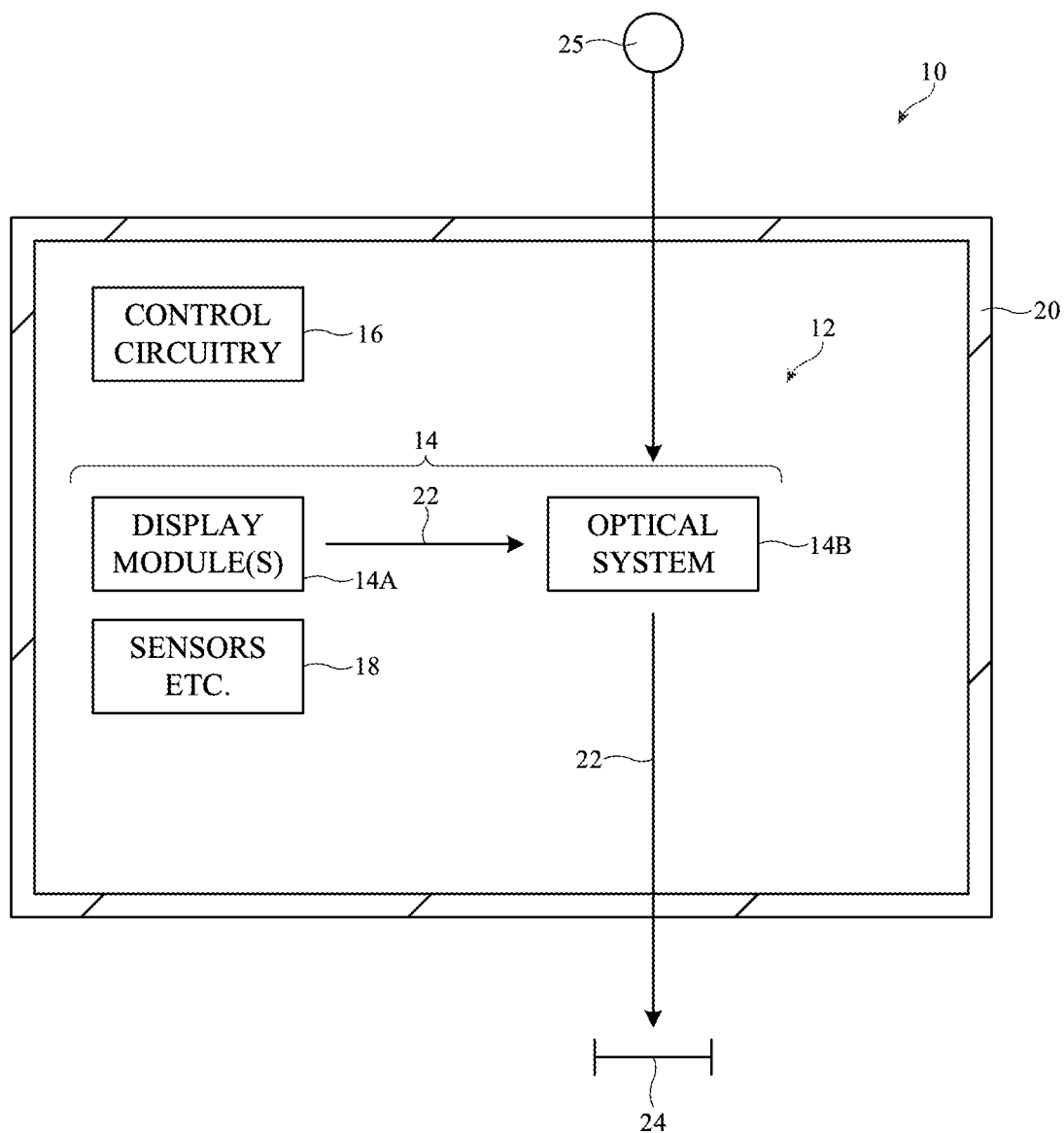
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 14A (sometimes referred to herein as display engines 14A) may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
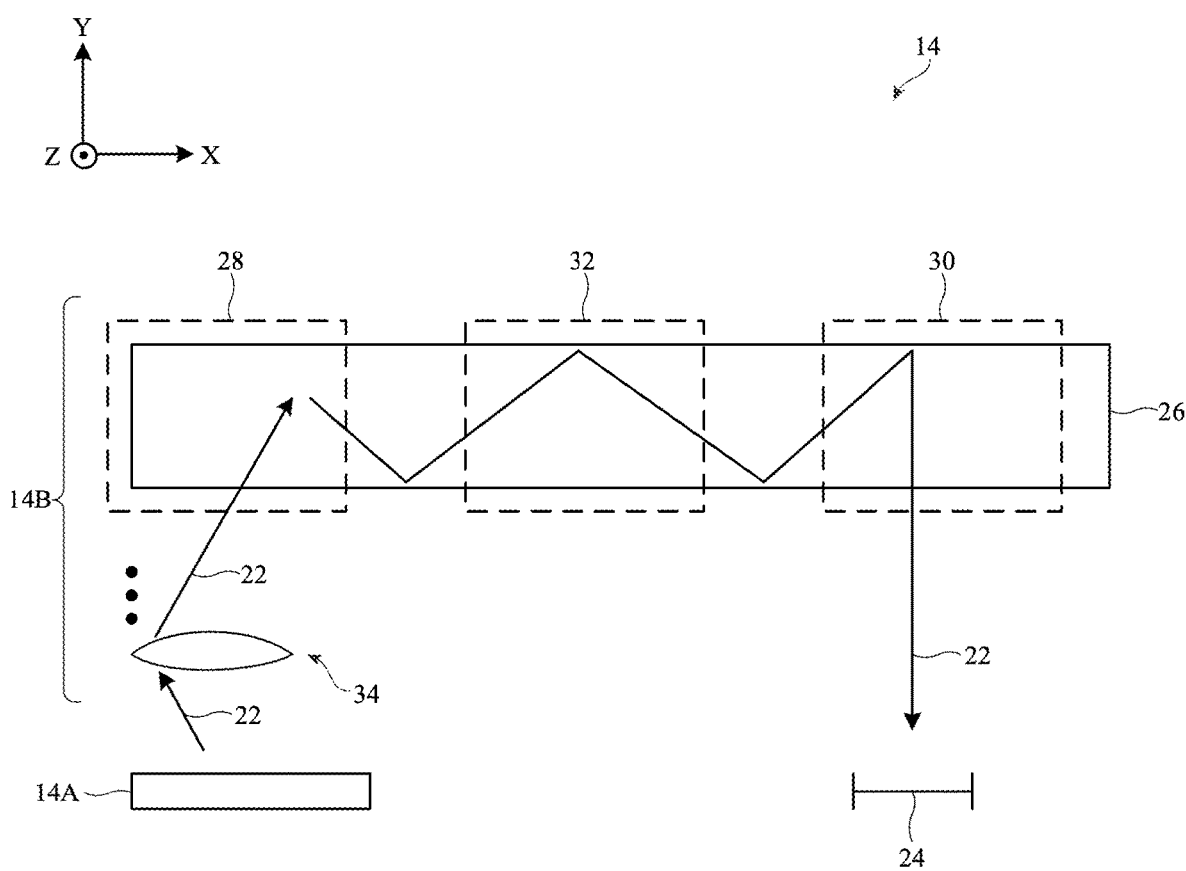
FIG. 2 is a top view of an illustrative optical system for a display having a waveguide with an input coupler in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate light 22 associated with image content to be displayed to eye box 24. Light 22 may be collimated using a lens such as collimating lens 34. Optical system 14B may be used to present light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide light 22 down its length via total internal reflection. Input coupler 28 may be configured to couple light 22 from display module 14A (lens 34) into waveguide 26, whereas output coupler 30 may be configured to couple light 22 from within waveguide 26 to the exterior of waveguide 26 and towards eye box 24. Input coupler 28 may include an input coupling prism and a scanning mirror or liquid crystal steering element. As an example, display module 14A may emit light 22 in direction +Y towards optical system 14B. When light 22 strikes input coupler 28, input coupler 28 may redirect light 22 so that the light propagates within waveguide 26 via total internal reflection towards output coupler 30 (e.g., in direction X). When light 22 strikes output coupler 30, output coupler 30 may redirect light 22 out of waveguide 26 towards eye box 24 (e.g., back along the Y-axis). In scenarios where cross-coupler 32 is formed at waveguide 26, cross-coupler 32 may redirect light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 includes a prism mounted to an exterior surface of waveguide 26 (e.g., an exterior surface defined by a waveguide substrate that contacts the grating medium or the polymer layer used to form output coupler 30) and a scanning mirror or liquid crystal steering element.

Figure 3:
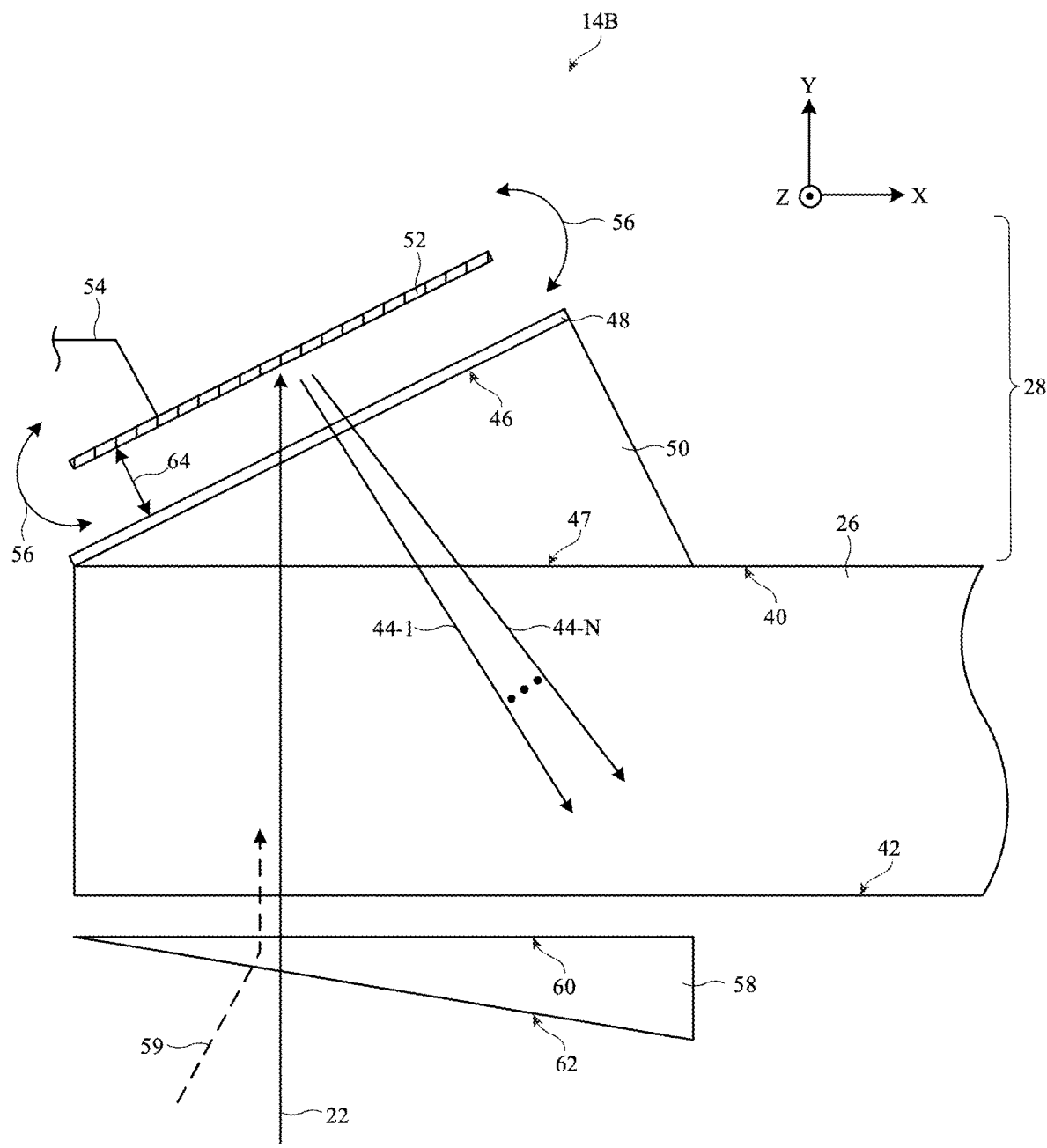
FIG. 3 is a top view of an illustrative input coupler having a prism and a scanning mirror in accordance with some embodiments.

FIG. 3 is a top view showing how input coupler 28 at waveguide 26 may include a prism and a scanning mirror. As shown in FIG. 3, input coupler 28 may include a prism (e.g., a reflective input coupling prism) such as prism 50. Prism 50 may have a bottom surface 47 mounted to exterior surface 40 of waveguide 26 (e.g., using an optically clear adhesive not shown in FIG. 3 for the sake of clarity).

As shown in FIG. 3, waveguide 26 may receive image light 22 (e.g., from display module 14A and lens 34 of FIG. 2). Prism 50 may be mounted to the side of waveguide 26 opposite to display module 14A and lens 34. For example, waveguide 26 may have an exterior surface 42 that opposes exterior surface 40. Exterior surface 42 may be interposed between prism 50 and display module 14A (e.g., waveguide 26 may be interposed between prism 50 and display module 14A). Image light 22 may enter waveguide 26 through surface 42 (e.g., at a sufficiently low angle with respect to the normal surface of surface 42 such that no total internal reflection occurs). Image light 22 may pass through surface 40 of waveguide 26 into prism 50. Prism 50 may have a surface 46 opposing surface 47. Surface 46 may be tilted in one or more directions (e.g., including out of the plane of the page, where the normal axis of surface 46 is oriented at a non-zero angle with respect to the +Y axis within the Z-Y plane in addition to a non-zero angle with respect to the +Y axis within the X-Y plane). Surface 46 may be curved if desired.

In some scenarios, image light 22 reflects off of surface 46 of prism 50 and back into waveguide 26 through surfaces 47 and 40. Image light 22 then propagates down the length of waveguide 26 via total internal reflection. In this way, prism 36 couples image light 22 into waveguide 26 despite being located on the side of waveguide 26 opposite to display module 14A (FIG. 2).

In general, it may be desirable for image light 22 to be provided with as large a field of view at eye box 24 as possible. Display module 14A may provide image light 22 to waveguide 26 within a particular (limited) field of view. However, if display module 14A provides image light 22 to waveguide 26 with too large of a field of view, display module 14A may undesirably occupy an excessive amount of space and may undesirably consume an excessive amount of power within system 10. It may therefore be desirable to be able to increase the field of view of the image light 22 provided to eye box 24 without increasing the field of view of image light 22 as incident upon waveguide 26.

If desired, input coupler 28 may include a switchable reflective structure (surface) such as scanning mirror 52 (sometimes referred to herein as input coupler scanning mirror 52). Input coupler scanning mirror 52 may serve to expand the field of view of image light 22 without increasing the size or power consumption of display module 14A. As shown in FIG. 3, input coupler scanning mirror 52 may overlap some or all of surface 46 of prism 50. Input coupler scanning mirror 52 may include, for example, a microelectromechanical systems (MEMS) scanning mirror, a piezoelectric mirror, a liquid crystal (LC) steering element, a digital micromirror device (DMD), or other reflective structures that are switchable between at least first and second states (e.g., orientations or angles with respect to surface 46 of prism 50).

Input coupler scanning mirror 52 may receive control signals over control path 54 (e.g., from control circuitry 16 of FIG. 1) that place input coupler scanning mirror 52 into a selected one of the states (orientations) at any given time. Control circuitry 16 may adjust the state (orientation) of input coupler scanning mirror 52 by rotating/tilting mirror 52 in the pupil plane, as shown by arrows 56. Input coupler scanning mirror 52 may be a one-dimensional (1D) scanning mirror rotatable over a single degree of freedom or may be a two-dimensional (2D) scanning mirror rotatable over two degrees of freedom (e.g., about the Z-axis and about any other desired axis such as an axis that is non-parallel with respect to the Z-axis).

Input coupler scanning mirror 52 may be separated from surface 46 of prism 50 by non-zero separation distance 64. Separation distance 64 may be selected to allow input coupler scanning mirror 52 to rotate freely without hitting prism 50 across the range of motion of the mirror. Display module 14A and lens 34 (FIG. 2) may focus a pupil of image light 22 onto input coupler scanning mirror 52 (e.g., display module 14A and lens 34 may create a pupil of image light 22 at the location of input coupler scanning mirror 52). Input coupler scanning mirror 52 may be rotatable over any desired range of angles (e.g., a range of 5 degrees, a range of 10 degrees, a range of greater than 5 degrees, a range of greater than 10 degrees, etc.). An optional coating such as coating 48 may be layered on surface 46 of prism 50. Coating 48 may be an anti-reflective (AR) coating or other coatings. If desired, input coupler scanning mirror 52 may impart a non-zero optical power to the image light 22 coupled into waveguide 26. Prism 50 may include multiple wedges of materials having different indices of refraction if desired. The wedges may have curved interfaces or interfaces that are tilted in one or more directions if desired.

Input coupler scanning mirror 52 may be rotatable over N states (orientations). Input coupler scanning mirror 52 may couple image light 22 into waveguide 26 at a different respective angle in each of the N states. For example, in a first state (orientation), input coupler scanning mirror 52 may couple image light 22 into waveguide 26 at a first angle as shown by arrow 44-1, in an Nth state (orientation), input coupler scanning mirror 52 may couple image light 22 into waveguide 26 at an Nth angle as shown by arrow 44-N, etc. Arrows 44 may be confined to a single plane (e.g., in scenarios where mirror 52 is a 1D scanning mirror) or may extend beyond a single plane (e.g., in scenarios where mirror 52 is a 2D scanning mirror).

The image light 22 coupled into waveguide 26 by input coupler scanning mirror 52 may have a corresponding relatively-small field of view (e.g., as provided by display module 14A and lens 45 of FIG. 2). This may allow display module 14A to be implemented in system 10 without consuming an excessive amount of space and power. Control circuitry 16 may rapidly adjust (toggle) the state (orientation) of input coupler scanning mirror 52 to direct image light 22 to a particular portion (subset) of the relatively large field of view at eye box 24 (FIG. 2) at any given time. The particular portion of the relatively large field of view to provide with image light may be the portion within which the user's gaze is located (e.g., based on gaze tracking data gathered by system 10), in one suitable arrangement. If desired, control circuitry 16 may scan mirror 52 over each of the N states to effectively fill in each image frame of the relatively large field of view at eye box 24. In this way, image light 22 may be coupled into waveguide 26 and provided to the eye box with a wider effective field of view than would otherwise be provided to the eye box or with image content being provided to only a subset of the field of view at any given time (e.g., without requiring a display module 14A that is excessively large or that consumes an excessive amount of power). As examples, the field of view at eye box 24 may be 60 degrees, between 55 and 65 degrees, greater than 45 degrees, greater than 55 degrees, or any other desired angle greater than field of view of image light 22 as incident upon waveguide 26. The example in which input coupler scanning mirror 52 is scanned over N discrete states (angles) is merely illustrative. If desired, input coupler scanning mirror 52 may be continuously adjusted over a continuous range of different angles.

If desired, an optional optical wedge such as wedge 58 may be interposed on the optical path between waveguide 26 and display module 14A. Image light 22 may pass through wedge 58 before passing through waveguide 26. Wedge 58 may have a first surface 60 facing waveguide 26 and an opposing second surface 62. Second surface 62 may be tilted at a non-parallel angle with respect to surface 42 of waveguide 26. Wedge 58 may help redirect image light 22 provided at other angles (e.g., angles non-parallel with respect to the Y-axis) towards input coupler scanning mirror 52, as shown by dashed arrow 59. This may allow display module 14A to be mounted at different locations or orientations with respect to waveguide 26 than would otherwise be possible in the absence of wedge 58. For example, wedge 58 may allow display module 14A to be located within a main frame for waveguide 26 (e.g., within support structures 20 of FIG. 1) without needing to be located in the temple or other portions of the support structures (e.g., thereby optimizing space consumption within system 10). Wedge 58 may be omitted or replaced with other optical elements such as lens elements if desired. Surfaces 60, 62, 42, and/or 40 may be provided with antireflective coatings, reflective coatings, any other desired coatings, or no coatings if desired.

Figure 4:
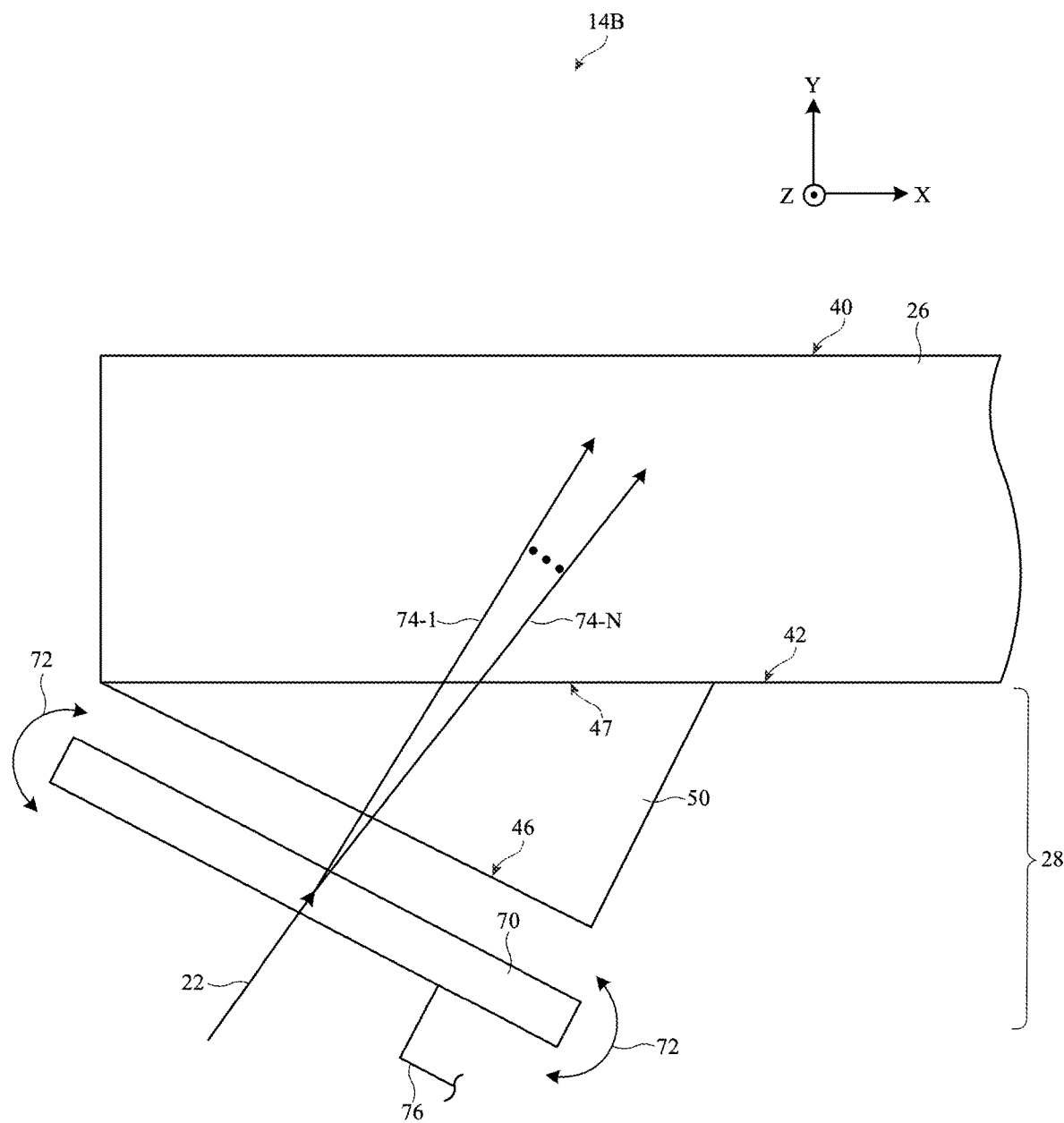
FIG. 4 is a top view of an illustrative input coupler having a prism and a transmissive liquid crystal steering element in accordance with some embodiments.

In another suitable arrangement, prism 50 may be mounted to the side of waveguide 26 facing display module 14A. FIG. 4 is a top view showing how prism 50 may be mounted to the side of waveguide 26 facing display module 14A. As shown in FIG. 4, surface 47 of prism 50 may be mounted to surface 42 of waveguide 26 (e.g., using optically clear adhesive not shown in FIG. 4 for the sake of clarity). Image light 22 may be incident upon transmissive (input) surface 46 of prism 50. Input coupler 28 may include a switchable transmissive element such as transmissive liquid crystal steering element 70. Liquid crystal steering element 70 may receive control signals over control path 76 that rotate (switch) liquid crystal steering element 70 between N states (orientations) as shown by arrows 72. Liquid crystal steering element 70 may be a 1D steering element or a 2D steering element. Liquid crystal steering element 70 may couple image light 22 at a different respective angle in each of the N states, as shown by arrows 74 (e.g., at a first angle as shown by arrow 74-1 in a first state, at an Nth angle as shown by arrow 74-N in an Nth state, etc.).

Control circuitry 16 may rapidly adjust (toggle) the state of liquid crystal steering element 70 to direct image light 22 to a particular portion (subset) of the relatively large field of view at eye box 24 (FIG. 2) at any given time. If desired, control circuitry 16 may scan liquid crystal steering element 70 over each of the N states to effectively fill in each image frame of the relatively large field of view at eye box 24. In this way, image light 22 may be coupled into waveguide 26 and provided to the eye box with a wider effective field of view than would otherwise be provided to the eye box or with image content being provided to only a subset of the field of view at any given time (e.g., without requiring a display module 14A that is excessively large or that consumes an excessive amount of power). The example in which liquid crystal steering element 70 is scanned over N discrete states (angles) is merely illustrative. If desired, liquid crystal steering element 70 may be continuously adjusted over a continuous range of different angles.

Figure 5:
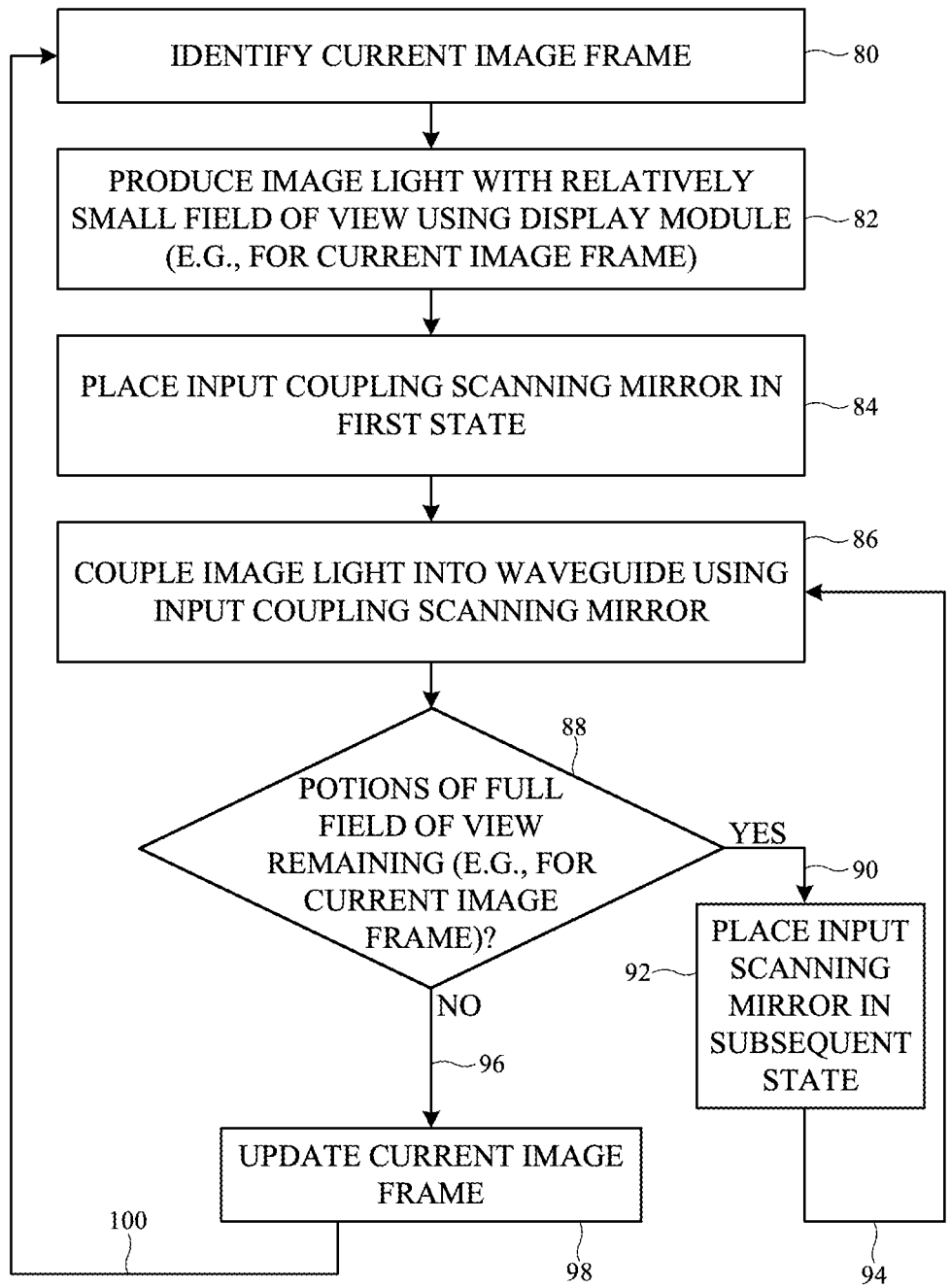
FIG. 5 is a flow chart of illustrative steps involved in using an input coupler scanning mirror to fill a relatively large field of view at an eye box with light in accordance with some embodiments.

FIG. 5 is a flow chart of illustrative steps that may be performed by system 10 to provide eye box 24 with a wider effective field of view than would otherwise be provided to the eye box using input coupler scanning mirror 52 of FIG. 3. While the steps of FIG. 5 are described in connection with the operation of input coupler scanning mirror 52 of FIG. 3, the steps of FIG. 5 may also be performed using liquid crystal steering element 70 of FIG. 4 in place of input coupler scanning mirror 52 (e.g., in scenarios where prism 50 is mounted to the side of waveguide 26 facing display module 14A).

At step 80, control circuitry 16 may identify a current image frame to display at eye box 24 (e.g., using image light 22). The image frame may be an image frame of a stream of video data or may include any other desired image data for display at eye box 24.

At step 82, display module 14A may produce image light 22 that includes a portion (subset) of the current image frame. The image light may be provided with a relatively small field of view. This may, for example, limit the amount of space and power required by display module 14A. Display module 14A may provide the image light to input coupler 28 on waveguide 26.

At step 84, control circuitry 16 may place input coupler scanning mirror 52 in a first state/orientation (e.g., using control signals provided over control path 54 of FIG. 3). In the first state, input coupler scanning mirror 52 may be oriented at a corresponding first angle (orientation) with respect to surface 46 of prism 50.

At step 86, input coupler scanning mirror 52 may couple image light 22 into waveguide 26 by reflecting the image light while in the current (e.g., first) state (e.g., while oriented at the first angle/orientation). For example, input coupler scanning mirror 52 may reflect the image light into waveguide 26 at the angle shown by arrow 44-1 of FIG. 3 in the first state. The image light may propagate down the length of waveguide 26 via total internal reflection. Output coupler 30 (FIG. 2) may couple the image light out of waveguide 26 and towards eye box 24. The portion of the current image frame included in the image light may be provided to a corresponding portion (subset) of the full field of view of eye box 24.

At step 88, control circuitry 16 may determine whether portions of the full field of view of eye box 24 remain to be displayed for the current image frame. If portions remain, processing may proceed to step 92 as shown by path 90.

At step 92, control circuitry 16 may place input coupler scanning mirror 52 in a subsequent state (e.g., where the input coupler scanning mirror is oriented at a different corresponding angle/orientation with respect to surface 46 of prism 50). Processing may loop back to step 86 as shown by path 94. Display module 14A may include a different portion (subset) of the current image frame in image light 22. Input coupler scanning mirror 52 may couple that portion of the current image frame into waveguide 26. For example, input coupler scanning mirror 52 may reflect the image light into waveguide 26 at the angle shown by arrow 44-N of FIG. 3 in this subsequent state. The image light may propagate down the length of waveguide 26 via total internal reflection. Output coupler 30 (FIG. 2) may couple the image light out of waveguide 26 and towards eye box 24. The portion of the current image frame included in the image light may be provided to a corresponding portion (subset) of the full field of view of eye box 24 (e.g., a different portion of the field of view than was provided with image light while input coupler scanning mirror 52 was in the first state). Once no portions of the full field of view remain to be displayed for the current image frame, processing may proceed to step 98 as shown by path 96.

At step 98, the current image frame may be updated (e.g., using additional image content such as the next image frame in a stream of video data to be displayed at eye box 24, etc.). Processing may loop back to step 82, as shown by path 100. By cycling through steps 82-98 faster than the response of the human eye (e.g., faster than 60 Hz, 120 Hz, 240 Hz, etc.), input coupler scanning mirror 52 may effectively fill or paint the full field of view of eye box 24 with image content (e.g., from a corresponding image frame) that appears to the user as a single image displayed at a single time, even though only a portion of the full field of view is provided with image light at any given time. This may allow eye box 24 to exhibit a relatively large effective field of view that is filled with relatively uniform image light despite the relatively small field of view of the image light 22 produced by display module 14A, thereby allowing display module 14A to consume a minimal amount of space and power in system 10. Two or more of the steps of FIG. 5 may be performed concurrently if desired.

Figure 6:
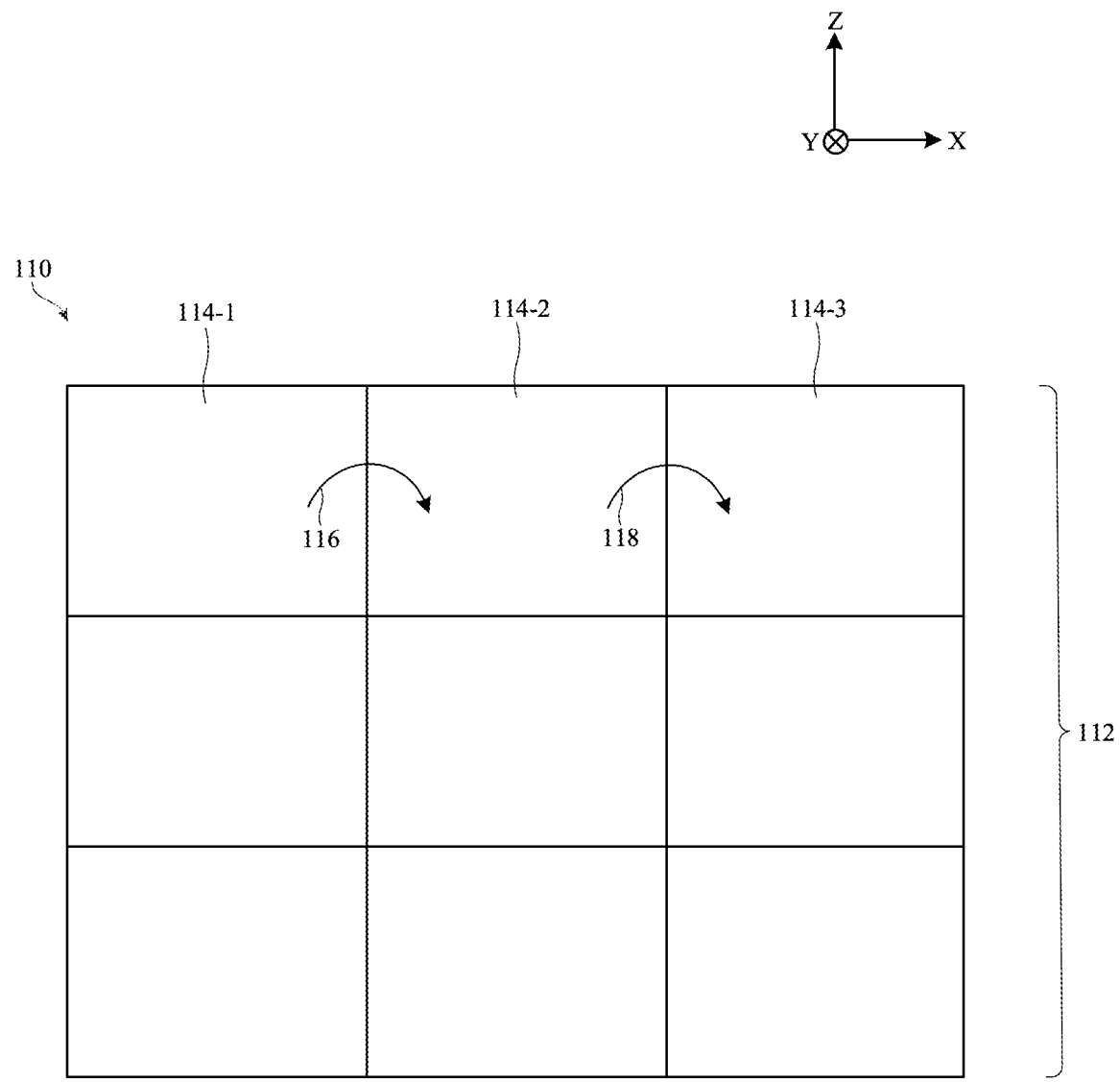
FIG. 6 is a diagram of a relatively large field of view at an eye box that may be filled with light by an illustrative input coupler scanning mirror in accordance with some embodiments.

FIG. 6 is a diagram of the full field of view of eye box 24 (e.g., as taken in the X-Z plane of FIGS. 3 and 4) when filled with light by input coupler scanning mirror 52 (e.g., while processing the steps of FIG. 5). As shown in FIG. 6, eye box 24 may have a relatively large field of view 112 (sometimes referred to herein as full field of view 112). Display module 14A and optical system 14B may display an image frame 110 within full field of view 112. However, input coupler scanning mirror 52 may provide image light 22 to eye box 24 within only a single corresponding portion (subset) 114 of full field of view 112 at any given time. Each portion 114 may correspond to the relatively small field of view of the image light 22 provided by display module 14A to waveguide 26, for example.

As an example, input coupler scanning mirror 52 may fill a first portion 114-1 of full field of view 112 in a first state (e.g., while processing step 86 of FIG. 5). Control circuitry 16 may adjust (rotate) input coupler scanning mirror 52 to a second state at which input coupler scanning mirror 52 fills a second portion 114-2 of full field of view 114, as shown by arrow 116. Subsequently, control circuitry 16 may adjust (rotate) input coupler scanning mirror 52 to a third state at which input coupler scanning mirror 52 fills a second portion 114-3 of full field of view 112, as shown by arrow 118. This process may continue until the entire full field of view 112 has been filled with image light from the corresponding image frame. Subsequent image frames may be similarly displayed. In the example of FIG. 6 in which full field of view 112 has nine portions 114 (e.g., where input coupler scanning mirror 52 has N=9 states), if each image frame is to be displayed at eye box 24 for 60 ms, each portion 114 of full field of view 112 may be filled with image light during a respective time period equal to 60/9 ms, which may be faster than detectable by the unaided human eye.

In the example of FIG. 6, input coupler scanning mirror 52 is a 2D scanning mirror that performs two-dimensional rotations. This is merely illustrative and, if desired, input coupler scanning mirror 52 may be a 1D scanning mirror (e.g., where the portions 114 of full field of view 112 lie within a single row or column). Full field of view 112 may include any desired number of portions 114 (e.g., N portions 114 each corresponding to a respective state (orientation) of input coupler scanning mirror 52). Portions 114 may have any desired shape and may be arranged in any desired pattern. Input coupler scanning mirror 52 may scan through portions 114 of full field of view 112 in any desired order. Full field of view 112 may have other shapes if desired.

Figure 7:
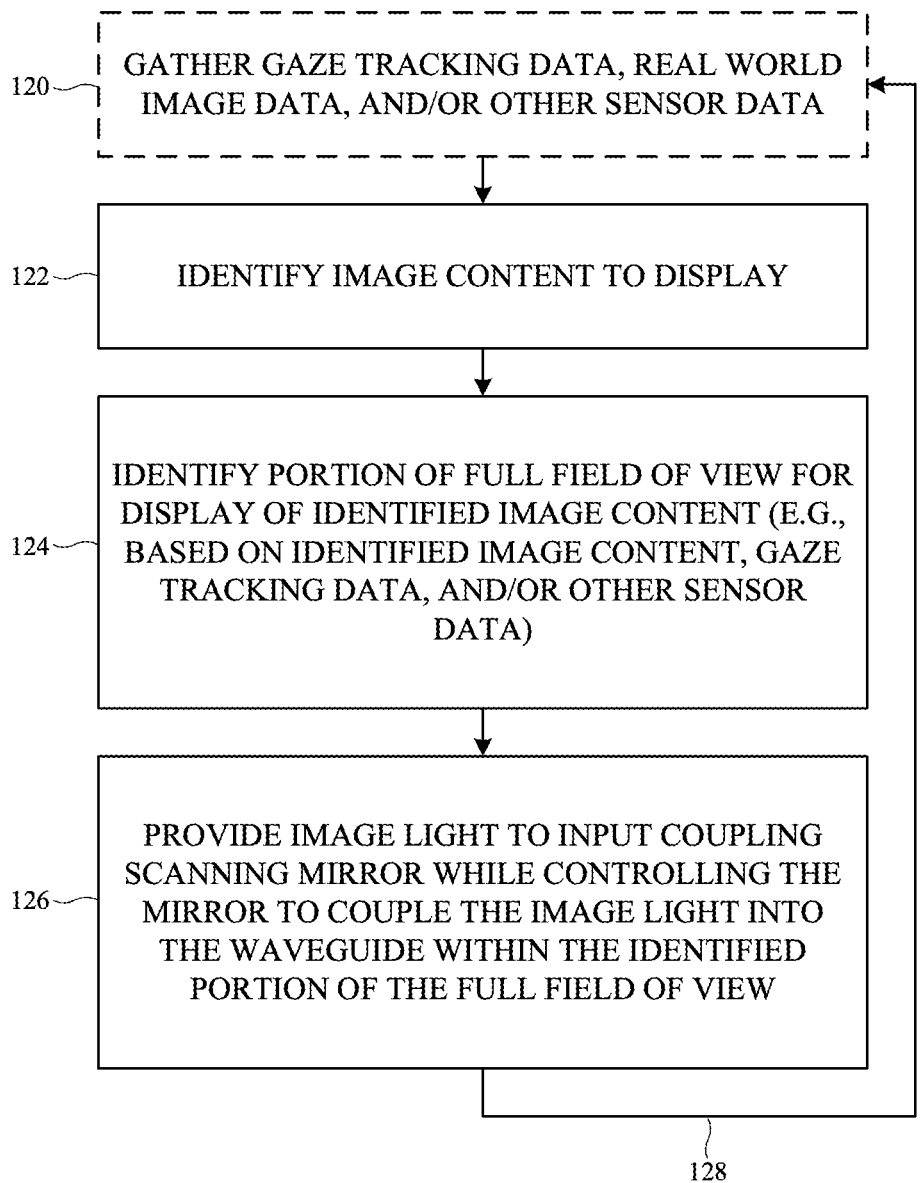
FIG. 7 is a flow chart of illustrative steps involved in using an input coupler scanning mirror to provide image light to different subsets of a relatively large field of view over time in accordance with some embodiments.

In another suitable arrangement, input coupler scanning mirror 52 may direct image light to different portions of the full field of view of eye box 24 at any given time (e.g., without filling in the entire full field of view with image data). FIG. 7 is a flow chart of illustrative steps that may be performed by system 10 to direct image light to different portions of the full field of view of eye box 24 at any given time using input coupler scanning mirror 52 of FIG. 3. While the steps of FIG. 7 are described in connection with the operation of input coupler scanning mirror 52 of FIG. 3, the steps of FIG. 7 may also be performed using liquid crystal steering element 70 of FIG. 4 in place of input coupler scanning mirror 52 (e.g., in scenarios where prism 50 is mounted to the side of waveguide 26 facing display module 14A).

At optional step 120, control circuitry 16 (FIG. 1) may gather gaze tracking data, real world image data, and/or other sensor data (e.g., using sensors 18 of FIG. 1). The gaze tracking data may include information identifying where a user's gaze is focused within eye box 24. The gaze tracking data may, for example, include infrared images captured by an infrared image sensor in response to infrared light that has been emitted by an infrared emitter and reflected off of a portion of the user's eye at eye box 24. The infrared images may identify a direction of the user's gaze at any given time. The real world image data may include images captured of the real world in front of system 10. The other sensor data may include orientation sensor data (e.g., accelerometer data, gyroscope data, compass data, etc.), proximity sensor data, or any other desired sensor data. Step 120 may be omitted if desired.

At step 122, control circuitry 16 may identify image content to display at eye box 24 using image light 22.

At step 124, control circuitry 16 may identify a portion of the full field of view of eye box 24 for display of the identified image content (e.g., as identified at step 122). Control circuitry 16 may identify the portion of the full field of view based on the identified image content to be displayed. For example, if the image content to be displayed is a visual alert or indicator that is always provided to the same part of the full field of view, the control circuitry may identify that part of the field of view as the portion of the field of view for display of the identified image content.

If desired, control circuitry 16 may identify the portion of the full field of view based at least in part on the gaze tracking data, real world image data, and/or other sensor data gathered while processing step 120. For example, the control circuitry 16 may identify the location of the full field of view where the user is currently looking (e.g., based on the gaze tracking data) as the portion of the full field of view for the identified image content to be displayed. Any desired combination of the gaze tracking data, real world image data, other sensor data, and the identified image content to display may be used to identify the portion of the full field of view based on the identified image content to be displayed.

At step 126, optical system 14B may provide image light 22 from display module 14A to the identified portion of the full field of view for the identified image content to be displayed. For example, control circuitry 16 may adjust the orientation of input coupler scanning mirror 52 so that input coupler scanning mirror 52 directs image light 22 towards the identified portion of the full field of view (e.g., after propagation through waveguide 26). Processing may loop back to step 120, as shown by path 128, to update the location of the displayed image content over time (e.g., as the user changes the direction of their gaze, as the real world scene in front of the user changes, as the image content to be displayed changes, and/or as sensor data changes). Two or more of the steps of FIG. 7 may be performed concurrently if desired.

Figure 8:
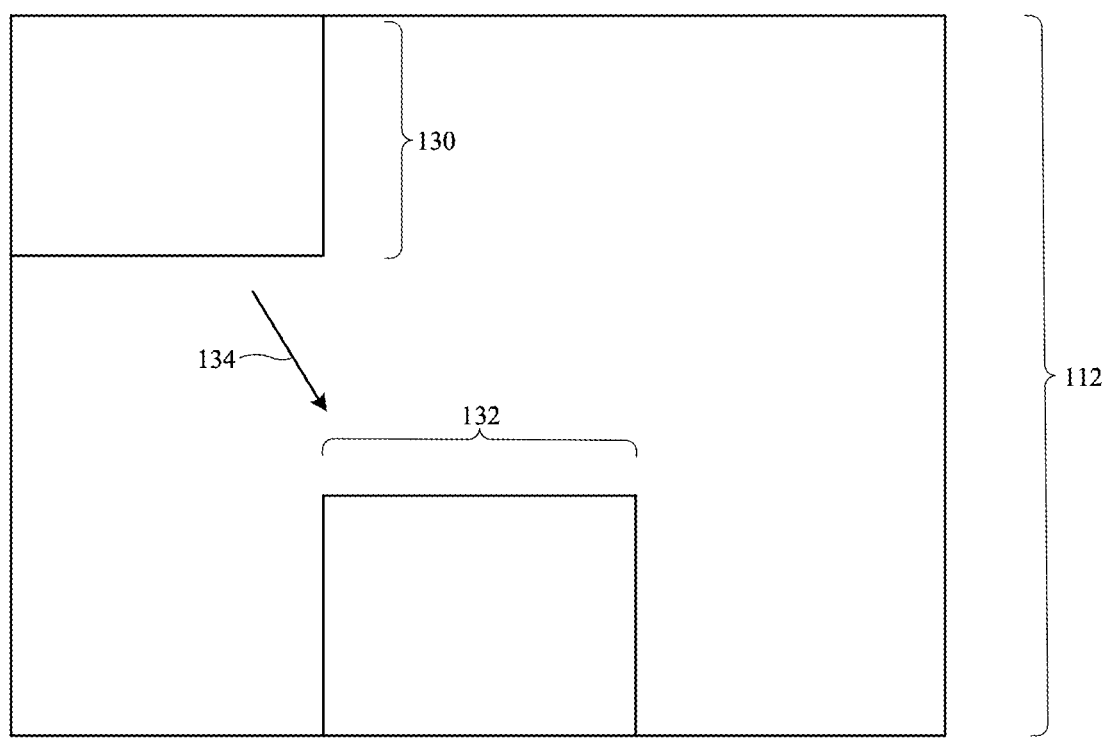
FIG. 8 is a diagram of a relatively large field of view at an eye box that may be provided with image light in different subsets of the field of view over time by an illustrative input coupling scanning mirror in accordance with some embodiments.

FIG. 8 is a diagram of the full field of view of eye box 24 (e.g., as taken in the X-Z plane of FIGS. 3 and 4) when provided with light by input coupler scanning mirror 52 within a particular portion of the full field of view (e.g., while processing the steps of FIG. 7). As shown in FIG. 8, eye box 24 may have full field of view 112. Input coupler scanning mirror 52 may provide image light 22 to eye box 24 within only a single corresponding portion (subset) of full field of view 112 at any given time. Each portion may correspond to the relatively small field of view of the image light 22 provided by display module 14A to waveguide 26, for example.

As an example, input coupler scanning mirror 52 may fill a first portion 130 of full field of view 112 in a first state and at a first time (e.g., while processing a first iteration of step 126 of FIG. 7). First portion 130 may be, for example, where the user's gaze is focused (e.g., as determined by the gaze tracking data gathered at step 120), the location of a visual alert to be displayed to the user, etc. Control circuitry 16 may adjust (rotate) input coupler scanning mirror 52 to a second state at which input coupler scanning mirror 52 fills a second portion 132 of full field of view 112, as shown by arrow 134. At a second time subsequent to the first time, input coupler scanning mirror 52 may fill second portion 132 of full field of view 112 in the second state (e.g., while processing a second iteration of step 126 of FIG. 7). This adjustment may occur, for example, when the user's gaze has shifted from portion 130 to portion 132 (e.g., as determined by the gaze tracking data gathered at step 120). This process may continue over time as the user's gaze continues to change, as the content to be displayed changes, etc.

In the example of FIG. 8, input coupler scanning mirror 52 is a 2D scanning mirror that performs two-dimensional rotations. This is merely illustrative and, if desired, input coupler scanning mirror 52 may be a 1D scanning mirror. Full field of view 112 may include any desired number of portions (e.g., N portions each corresponding to a respective state (orientation) of input coupler scanning mirror 52). The portions (e.g., portions 130 and 132) may have any desired shape and may be arranged in any desired pattern. Full field of view 112 may have other shapes if desired.

As described above, one aspect of the present technology is the gathering and use of data available from various sources to improve the delivery of images to users and/or to perform other display-related operations. The present disclosure contemplates that in some instances, this gathered data may include personal information data that uniquely identifies or can be used to contact or locate a specific person. Such personal information data can include facial recognition data, demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to update displayed images and/or to perform other desired display operations. Accordingly, use of such personal information data enables users to view updated display images. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user authentication, the present technology can be configured to allow users to select to "opt in" or "opt out" of participation in the collection of personal information data during registration for services or anytime thereafter (e.g., the user may still use other means of authenticating themselves for a particular head-mounted device, such as by entering a password, providing a fingerprint, or using other credentials). In another example, users can select not to perform facial recognition based authentication or other operations that gather personal information data. In yet another example, users can select to limit the length of time facial recognition and authentication is performed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, head-mounted device 10 may display images or perform authentication based on non-personal information data or a bare minimum amount of personal information, such as the content being requested by the device associated with a user, other non-personal information available to the display system, or publicly available information.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system (e.g., an electronic system including the display systems described herein). In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The display systems described herein may be used for these types of systems and for any other desired display arrangements.

The foregoing is merely illustrative and various modifications can be made to the described embodiments. The foregoing embodiments may be implemented individually or in any combination.

What is claimed is:

1. An electronic device comprising:
   a projector configured to produces light;
   a waveguide having a lateral surface;
   an input coupler configured to couple the light into the waveguide, wherein the waveguide is configured to propagate the light via total internal reflection and wherein the input coupler comprises:
      a prism mounted to the lateral surface of the waveguide and having a tilted surface that is oriented at a non-parallel angle with respect to the lateral surface of the waveguide, and
      a scanning mirror overlapping the tilted surface of the prism and separated from the tilted surface of the prism by a non-zero distance, wherein the scanning mirror is configured to receive the light through the waveguide and the prism and wherein the scanning mirror is configured to be rotated over a set of orientations while reflecting the light into the waveguide through the prism; and
   an output coupler on the waveguide and configured to couple the image light out of the waveguide.

2. The electronic device of claim 1, wherein the scanning mirror comprises a one-dimensional (1D) scanning mirror.

3. The electronic device of claim 1, wherein the scanning mirror comprises a two-dimensional (2D) scanning mirror.

4. The electronic device of claim 1, wherein the scanning mirror comprises a microelectromechanical systems (MEMS) mirror.

5. The electronic device of claim 1, wherein the scanning mirror comprises a piezoelectric mirror.

6. The electronic device of claim 1, further comprising an antireflective coating on the tilted surface of the prism.

7. The electronic device of claim 1, further comprising:
an optical wedge, wherein the waveguide is interposed between the optical wedge and the prism, the optical wedge has a first surface facing the waveguide and a second surface opposite the first surface, the second surface is oriented at a non-parallel angle with respect to the lateral surface of the waveguide, and the optical wedge is configured to transmit the light to the waveguide.

8. The electronic device of claim 1, wherein the output coupler comprises an optical element selected from the group consisting of: a louvered mirror in the waveguide and a set of volume holograms in the waveguide.

9. The electronic device of claim 1, further comprising:
one or more processors configured to control the projector to include an image frame in the light and configured to provide the image frame to an eye box by scanning the scanning mirror over each orientation in the set of orientations.

10. The electronic device of claim 1, further comprising:
sensor circuitry configured to generate gaze tracking data, the scanning mirror being configured to rotate based on a gaze location identified by the gaze tracking data.

11. A method of operating a display system having a projector, one or more processors, a waveguide, an input coupler scanning mirror, and an output coupler on the waveguide, the method comprising:
with the projector, producing image light;
with the input coupler scanning mirror, while in a first orientation, reflecting the light into the waveguide, wherein the display system has an input coupling prism mounted to the waveguide, the waveguide being interposed between the projector and the input coupling prism, wherein the input coupling prism is interposed between the waveguide and the input coupler scanning mirror;
with the output coupler, coupling, out of the waveguide, the light reflected into the waveguide while the input coupler scanning mirror is in the first orientation;
with the input coupler scanning mirror, while in a second orientation different from the first orientation, reflecting the light into the waveguide; and
with the output coupler, coupling, out of the waveguide, the light reflected into the waveguide while the input coupler scanning mirror is in the second orientation.

12. The method of claim 11, wherein the light includes an image frame, the method further comprising:
with the output coupler, filling a first portion of a field of view of the eye box with the light while the input coupler scanning mirror is in the first orientation, wherein the first portion of the field of view corresponds to a first portion of the image frame; and
with the output coupler, filling a second portion of a field of view of the eye box with the light while the input coupler scanning mirror is in the second orientation, wherein the second portion of the field of view corresponds to a second portion of the image frame that is different from the first portion of the image frame.

13. The method of claim 11, further comprising sensor circuitry, the method further comprising:
with the sensor circuitry, capturing gaze tracking data; and
with one or more processors, placing the input coupler scanning mirror in the second orientation in response to a change in gaze direction identified by the captured gaze tracking data.

14. The method of claim 13, further comprising:
with the waveguide, transmitting real world light through the output coupler.

15. The method of claim 11, wherein the input coupler scanning mirror is configured to perform a two-dimensional rotation to transition from the first orientation to the second orientation.

16. The method of claim 11, wherein the input coupler scanning mirror is configured to perform a one-dimensional rotation to transition from the first orientation to the second orientation.

17. The method of claim 11, wherein the input coupler scanning mirror is separated from the input coupling prism by a non-zero distance, and wherein the method further comprises:
with the input coupling prism, transmitting the light produced by the projector to the input coupler scanning mirror; and
with the input coupling prism, transmitting the light reflected by the input coupler scanning mirror into the waveguide.

18. An electronic device comprising:
a projector configured to produce light;
a waveguide having a lateral surface;
an input coupler configured to couple the light into the waveguide, wherein the waveguide is configured to propagate the light coupled into the waveguide by the input coupler via total internal reflection and wherein the input coupler comprises:
a prism mounted to the lateral surface of the waveguide and having a tilted surface that is oriented at a non-parallel angle with respect to the lateral surface of the waveguide, and
a transmissive liquid crystal steering element overlapping the tilted surface of the prism and separated from the tilted surface of the prism by a non-zero distance, wherein the transmissive liquid crystal steering element is configured to transmit the light into the waveguide through the prism while being rotated over a plurality of orientations; and
an output coupler on the waveguide and configured to couple the light out of the waveguide.

19. The electronic device of claim 18, further comprising:
one or more processors configured to control the projector to include an image frame in the light and configured to provide the image frame to the eye box by scanning the transmissive liquid crystal steering element over each orientation in the plurality of orientations.

20. The electronic device of claim 18, further comprising:
sensing circuitry configured to gather gaze tracking data associated with the eye box; and
one or more processors is configured to rotate the transmissive liquid crystal steering element based on a gaze location identified by the gathered gaze tracking data.

* * * * *

UNITED STATES PATENT AND TRADEMARK OFFICE
CERTIFICATE OF CORRECTION

PATENT NO. : 11,740,466 B1
APPLICATION NO. : 17/203368
DATED : August 29, 2023
INVENTOR(S) : Vikrant Bhakta et al.

It is certified that error appears in the above-identified patent and that said Letters Patent is hereby corrected as shown below:

In the Claims

Column 16, Line 46, Claim 1, "produces" should read -- produce --

Column 16, Line 65, Claim 1, "couple the image light out of the waveguide." should read -- couple the light out of the waveguide. --

Signed and Sealed this
Thirteenth Day of February, 2024

*Katherine Kelly Vidal*
Director of the United States Patent and Trademark Office